US012698762B1

(12) United States Patent　　　　　(10) Patent No.:　US 12,698,762 B1

Asher　　　　　　　　　　　　　　　(45) Date of Patent:　　　Aug. 4, 2026

(54) METHODS, SYSTEMS, AND COMPUTER-READABLE MEDIA FOR USE IN HARVESTING HEAT FROM SUBTERRANEAN GEOLOGIC FORMATIONS

(71) Applicant: MAZAMA ENERGY, INC., Seattle, WA (US)

(72) Inventor: Gregory B. Asher, Southlake, TX (US)

(73) Assignee: MAZA AA ENERGY, INC., Frisco, TX (US)

( * ) Notice:　Subject to any disclaimer, the term of this patent is extended or adjusted under 35 U.S.C. 154(b) by 0 days.

(21) Appl. No.: 19/297,587

(22) Filed:　Aug. 12, 2025

(51) Int. Cl.
　　*F03G 4/00*　　　(2006.01)
　　*E21B 43/267*　　(2006.01)
(52) U.S. Cl.
　　CPC ............. *F03G 4/072* (2021.08); *F03G 4/026* (2021.08); *E21B 43/267* (2013.01)
(58) Field of Classification Search
　　CPC ......... F03G 4/072; F03G 4/026; E21B 43/267
　　See application file for complete search history.

(56)　　　　　References Cited

U.S. PATENT DOCUMENTS

| | | | |
|---|---|---|---|
| 2,970,645 A | 2/1961 | Glass | |
| 3,270,816 A | 9/1966 | Staadt | |
| 3,817,038 A * | 6/1974 | Paull | ...................... F03G 4/074 |
| | | | 423/220 |
| 4,200,152 A | 4/1980 | Foster | |

| | | | |
|---|---|---|---|
| 4,896,362 A | 1/1990 | Parker | |
| 4,974,675 A | 12/1990 | Austin et al. | |
| 5,482,116 A | 1/1996 | El-Rabaa et al. | |
| | (Continued) | | |

FOREIGN PATENT DOCUMENTS

| | | | |
|---|---|---|---|
| DE | 102008009499 A1 | 8/2009 | |
| EP | 3575547 A2 | 4/2019 | |
| | (Continued) | | |

OTHER PUBLICATIONS

U.S. Dept. of Energy, "*What is an Enhanced Geothermal System (EGS)?*", DOE/EE-0785, Sep. 2012.

(Continued)

*Primary Examiner* — Jesse S Bogue

(74) *Attorney, Agent, or Firm* — Jeffrey B. Wendt; The Wendt Firm, P.C.

(57)　　　　　　ABSTRACT

Systems, processes, and non-transitory computer-readable media for use in harvesting heat from subterranean geologic formations. Determining if power produced meets a power target produced by a power plant at selected temperature, pressure, and flow rate of an initial heat extraction fluid. If less than target, flowrate of the fluid is increased, and if more than target, decreasing flowrate of the fluid. If power produced equals the power target, proceed to determine if a producer well pressure would meet a producer well pressure target, and if pressure is less than target, increasing the initial heat extraction fluid pressure, and if the pressure is more than target, decreasing the initial heat extraction fluid pressure. If pressure equals target, flow initial heat extraction fluid from the injector well into and through a first heat extraction stage to form a heated heat extraction fluid, then determining whether a second heat extraction stage is required.

20 Claims, 9 Drawing Sheets

(56) References Cited

U.S. PATENT DOCUMENTS

| | | | |
|---|---|---|---|
| 5,685,362 A * | 11/1997 | Brown .................... F24T 10/20 |
| | | | 165/45 |
| 6,543,538 B2 | 4/2003 | Tolman et al. |
| 7,331,385 B2 | 2/2008 | Symington et al. |
| 7,631,691 B2 | 12/2009 | Symington et al. |
| 8,201,626 B2 | 6/2012 | Balczewski |
| 8,540,020 B2 | 9/2013 | Stone et al. |
| 8,863,839 B2 | 10/2014 | Kaminsky et al. |
| 9,074,794 B2 | 7/2015 | Suryanarayana et al. |
| 9,080,441 B2 | 7/2015 | Meurer et al. |
| 9,091,460 B2 * | 7/2015 | Parrella, Sr. ............ F24T 10/30 |
| 9,284,819 B2 | 3/2016 | Tolman et al. |
| 9,322,239 B2 | 4/2016 | Boza et al. |
| 9,328,600 B2 | 5/2016 | Kaminsky et al. |
| 9,703,904 B2 | 7/2017 | Suryanarayana et al. |
| 9,726,157 B2 * | 8/2017 | Sweatman .............. F24T 10/20 |
| 9,945,218 B2 | 4/2018 | Tolman et al. |
| 9,963,955 B2 | 5/2018 | Tolman et al. |
| 10,140,393 B2 | 11/2018 | Hoda et al. |
| 11,125,472 B2 | 9/2021 | Toews et al. |
| 11,162,346 B2 | 11/2021 | Montalvo et al. |
| 11,460,008 B2 * | 10/2022 | Toews ...................... F03G 7/04 |
| 11,644,220 B1 * | 5/2023 | Marsh ..................... F03G 4/026 |
| | | | 165/45 |
| 11,697,759 B1 | 7/2023 | Dusterhoft |
| 11,808,121 B2 | 11/2023 | Norbeck et al. |
| 11,927,369 B2 | 3/2024 | Norbeck et al. |
| 12,066,012 B2 * | 8/2024 | Kalaei ..................... F03G 4/063 |
| 12,247,470 B1 | 3/2025 | Alcantar et al. |
| 12,281,550 B2 | 4/2025 | Norbeck et al. |
| 12,297,724 B1 | 5/2025 | Latimer et al. |
| 12,305,893 B1 | 5/2025 | Alcantar et al. |
| 12,352,133 B2 * | 7/2025 | Chambers, Sr. ...... E21B 43/267 |
| 2004/0206085 A1 | 10/2004 | Koenig et al. |
| 2006/0157243 A1 | 7/2006 | Nguyen |
| 2007/0107901 A1 | 5/2007 | Maguire |
| 2010/0078169 A1 | 4/2010 | Symington et al. |
| 2010/0282460 A1 | 11/2010 | Stone et al. |
| 2010/0307756 A1 | 12/2010 | Jung et al. |
| 2011/0146982 A1 | 6/2011 | Kaminsky et al. |
| 2012/0018120 A1 * | 1/2012 | Danko ................... F24T 10/20 |
| | | | 165/45 |
| 2012/0312545 A1 | 12/2012 | Suryanarayana et al. |
| 2013/0062055 A1 | 3/2013 | Tolman et al. |

| | | | |
|---|---|---|---|
| 2013/0068469 A1 | 3/2013 | Lin et al. |
| 2013/0112403 A1 | 5/2013 | Meurer et al. |
| 2013/0220604 A1 | 8/2013 | El-Rabaa et al. |
| 2013/0306315 A1 | 11/2013 | Kaminsky et al. |
| 2014/0008073 A1 | 1/2014 | Rey-Bethbeder et al. |
| 2015/0167441 A1 | 6/2015 | Howell et al. |
| 2015/0247372 A1 | 9/2015 | Boza et al. |
| 2015/0315890 A1 | 11/2015 | Tolman et al. |
| 2015/0354859 A1 * | 12/2015 | Marsh ..................... F24T 10/20 |
| | | | 165/45 |
| 2015/0369521 A1 | 12/2015 | Buscheck |
| 2016/0102528 A1 | 4/2016 | Wise |
| 2016/0168962 A1 | 6/2016 | Tolman et al. |
| 2016/0169212 A1 | 6/2016 | Hine |
| 2017/0175505 A1 | 6/2017 | Curlett |
| 2019/0154010 A1 * | 5/2019 | Toews ...................... C09K 5/04 |
| 2019/0346181 A1 | 11/2019 | Toews |
| 2020/0173692 A1 | 6/2020 | Buscheck et al. |
| 2020/0191444 A1 | 6/2020 | Nevison et al. |
| 2020/0217181 A1 | 7/2020 | Norbeck et al. |
| 2021/0231109 A1 | 7/2021 | Toews et al. |
| 2023/0114197 A1 | 4/2023 | Hughes |

FOREIGN PATENT DOCUMENTS

| | | |
|---|---|---|
| WO | WO2019095032 A1 | 5/2019 |
| WO | WO2019213735 A1 | 11/2019 |
| WO | WO2021146791 A1 | 7/2021 |
| WO | WO2022061320 A1 | 3/2022 |
| WO | WO2022155743 A1 | 7/2022 |
| WO | WO2024028646 A1 | 2/2024 |
| WO | WO2025041108 A1 | 2/2025 |
| WO | WO2025046518 A1 | 3/2025 |

OTHER PUBLICATIONS

Muir, "*New Opportunities and Applications for Closed-Loop Geothermal Energy Systems*", Geothermal Rising Bulletin, Dec. 2020, vol. 49, No. 4.
Erkan, K. et al., "Understanding the Chena Hot Springs, Alaska", *Geothermics* 37 (2008) 565-585.
Leuchenberg et al., "Development and Performance of Surface Equipment for High Temperature Underbalanced Drilling in Sour, Severely Under Pressured Formation", Mobil Oil (2004) pp. 1-10.

* cited by examiner

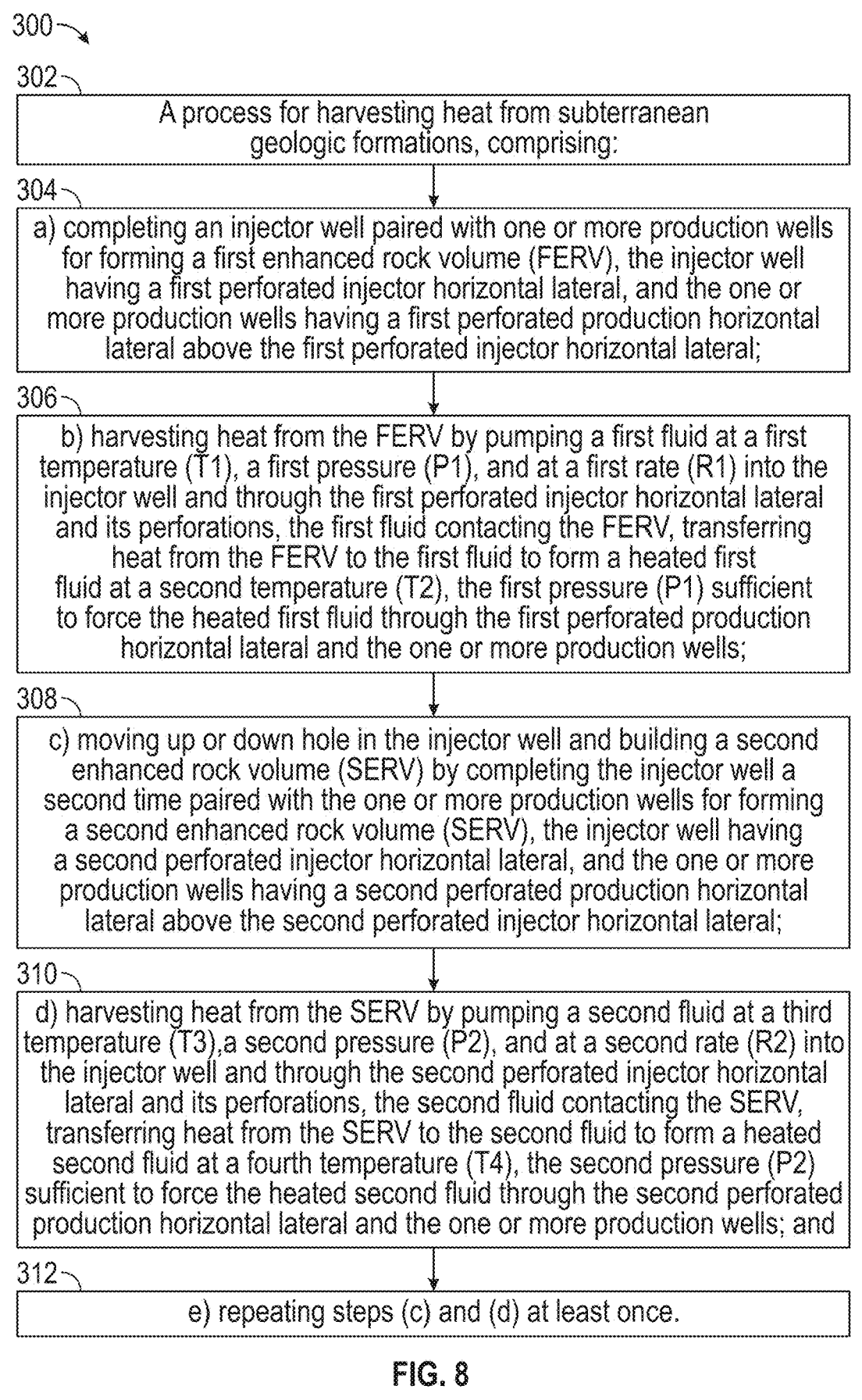

<div style="border:1px solid">

A process for harvesting heat from subterranean
geologic formations, comprising:

</div>

304 — a) completing an injector well paired with one or more production wells
for forming a first enhanced rock volume (FERV), the injector well
having a first perforated injector horizontal lateral, and the one or
more production wells having a first perforated production horizontal
lateral above the first perforated injector horizontal lateral;

306 — b) harvesting heat from the FERV by pumping a first fluid at a first
temperature (T1), a first pressure (P1), and at a first rate (R1) into the
injector well and through the first perforated injector horizontal lateral
and its perforations, the first fluid contacting the FERV, transferring
heat from the FERV to the first fluid to form a heated first
fluid at a second temperature (T2), the first pressure (P1) sufficient
to force the heated first fluid through the first perforated production
horizontal lateral and the one or more production wells;

308 — c) moving up or down hole in the injector well and building a second
enhanced rock volume (SERV) by completing the injector well a
second time paired with the one or more production wells for forming
a second enhanced rock volume (SERV), the injector well having
a second perforated injector horizontal lateral, and the one or more
production wells having a second perforated production horizontal
lateral above the second perforated injector horizontal lateral;

310 — d) harvesting heat from the SERV by pumping a second fluid at a third
temperature (T3), a second pressure (P2), and at a second rate (R2) into
the injector well and through the second perforated injector horizontal
lateral and its perforations, the second fluid contacting the SERV,
transferring heat from the SERV to the second fluid to form a heated
second fluid at a fourth temperature (T4), the second pressure (P2)
sufficient to force the heated second fluid through the second perforated
production horizontal lateral and the one or more production wells; and

312 — e) repeating steps (c) and (d) at least once.

FIG. 8

METHODS, SYSTEMS, AND COMPUTER-READABLE MEDIA FOR USE IN HARVESTING HEAT FROM SUBTERRANEAN GEOLOGIC FORMATIONS

CROSS-REFERENCE TO RELATED APPLICATIONS

This application may be related to U.S. provisional application No. 63/680,402, filed Aug. 7, 2024, and Patent Cooperation Treaty application no. PCT/US2025/033935, filed Jun. 17, 2025, which earlier filed provisional and Patent Cooperation Treaty patent applications are incorporated by reference herein in their entirety.

BACKGROUND INFORMATION

Technical Field

The present disclosure relates to systems, processes, and non-transitory computer-readable media for harvesting heat from subterranean geologic formations, and more particularly to systems, processes, and non-transitory computer-readable media for harvesting heat from subterranean geologic formations between injector and producer wells in enhanced geothermal systems.

Background Art

In our co-pending U.S. and PCT patent applications, we disclosed how heat is harvested from Dry Hot Rock ("DRH") via one or more Enhanced Rock Volumes ("ERV") built from a horizontal injector, horizontal producer, and a series of fractures connecting the injector to the producer, and how heat is recovered effectively only from the ERV due to the low thermal conductivity of the rock. Long horizontal well laterals can harvest heat from a large area that is dependent on the effective area of the fractures, but the depth of recovery from the area is limited by the rock thermal conductivity. The quality of heat will diminish as this ERV is harvested.

Also in our co-pending patent applications mentioned above, we explained that heat outside the ERV remains unharvested. We proposed more robust systems and processes for harvesting heat from subterranean geologic formations, and in particular geothermal formations. The systems, processes, and non-transitory computer-readable media of the present disclosure build on and may be used in those systems and processes.

SUMMARY

In accordance with the present disclosure, systems, processes, and non-transitory computer-readable media are described which reduce or overcome many of the faults of previously known systems and processes. In systems and processes of the present disclosure laterals are drilled from an existing well used by the depleted ERV, either above or below, (or both above and below) the abandoned ERV to create a new ERV. These "stacked ERV's" of the present disclosure are applicable to enhanced geothermal systems since an ERV is required to harvest the heat. Since the rock has no effective permeability, there can be no conventional fluid flow within the rock. Heat is recovered from the rock only by thermal conduction within the rock. The "new" (second, third, N) ERV's are reached by drilling and completing new laterals, which will be cooler above and hotter below a first (sometimes referred to as the abandoned) ERV. The systems and processes of the present disclosure can be applied in vertical, deviated and horizontal wells, regardless of temperature of the formation and regardless of the completion of the well but are particularly well-suited for horizontal wells.

A first aspect of the disclosure is a method comprising:
a) selecting a subterranean geothermal formation;
b) selecting an amount and temperature of effluent heat extraction fluid from a geothermal power plant producing power from the subterranean geothermal formation, the effluent heat extraction fluid having an effluent fluid pressure;
c) selecting an amount and temperature of new heat extraction fluid from a fluid source;
d) mixing the effluent heat extraction fluid and the new heat extraction fluid to form an initial heat extraction fluid having an initial heat extraction fluid temperature and pressure;
e) selecting a flowrate of the initial heat extraction fluid;
f) selecting an injector well geometry and calculating head pressure change, friction pressure change, and enthalpy gain or loss with the subterranean geothermal formation in which the injector well is positioned for the injector well geometry and the initial heat extraction fluid temperature, pressure and flowrate;
g) determining if power produced would meet a power target produced by the power plant at the temperature, pressure, and flow rate of the initial heat extraction fluid, and
  1) if the power produced is less than the power target, increasing flowrate of the initial heat extraction fluid, and repeating steps (e), (f), and (g);
  2) if the power produced is more than the power target, decreasing flowrate of the initial heat extraction fluid, and repeating steps (e), (f), and (g);
  3) if the power produced equals the power target, proceed to step (h);
h) determining if a producer well pressure would meet a producer well pressure target,
  1) if the producer well pressure is less than the pressure target, increasing the initial heat extraction fluid pressure, and repeating steps (e)-(h);
  2) if the producer well pressure is more than the pressure target, decreasing the initial heat extraction fluid pressure, and repeating steps (e)-(h);
  3) if the producer well pressure equals the pressure target, proceed to step (i);
i) flowing the initial heat extraction fluid from the injector well into and through a first heat extraction stage in the subterranean geothermal formation to form a heated heat extraction fluid;
j) determining whether a second heat extraction stage is required to meet the power target, and if no, proceed to step (k), and if yes, repeat steps (e) (i);
k) flowing the heated heat harvesting fluid through the producer well to a producer wellhead and then to the power plant.

A second aspect of the present disclosure is a method comprising:
a) selecting a subterranean geothermal formation;
b) selecting an amount and temperature of effluent heat extraction fluid from a geothermal power plant producing power from the subterranean geothermal formation, the effluent heat extraction fluid having an effluent fluid pressure;

c) selecting an amount and temperature of new heat extraction fluid from a fluid source;

d) mixing the effluent heat extraction fluid and the new heat extraction fluid to form an initial heat extraction fluid having an initial heat extraction fluid temperature and pressure;

e) selecting a flowrate of the initial heat extraction fluid;

f) determining if power produced would meet a power target produced by the geothermal power plant at the temperature, pressure, and flow rate of the initial heat extraction fluid, and 1) if the power is less than the power target, increasing the flowrate of the initial heat extraction fluid, and repeating steps (e) and (f);

2) if the power is more than the power target, decreasing the flowrate of the initial heat extraction fluid, and repeating steps (e) and (f);

3) if the power equals the power target, proceed to step (g);

g) determining if a producer well pressure would meet a pressure target, 1) if the producer well pressure is less than the pressure target, increasing the pressure of the initial heat extraction fluid, and repeating steps (e), (f), and (g);

2) if the producer well pressure is more than the pressure target, decreasing the pressure of the initial heat extraction fluid, and repeating steps (e), (f), and (g);

3) if the pressure target is met, proceed to step (h);

h) selecting an injector well geometry and calculating head pressure change, friction pressure change, and enthalpy gain or loss with the subterranean geothermal formation in which the injector well is positioned for the injector well geometry and the initial heat extraction fluid temperature, pressure and flowrate;

i) flowing the initial heat extraction fluid from the injector well into and through a first heat harvesting stage in the subterranean geothermal formation to form a heated heat extraction fluid;

j) determining whether another heat extraction stage is required to meet the power target, and if no, proceed to step (k), and if yes, repeat steps (e)-(j);

k) flowing the heated heat extraction fluid through the producer well to a producer wellhead and then to the power plant.

In certain embodiments the subterranean geothermal formation comprises dry hot rock (DHR).

In certain embodiments step (g)(1) of the first aspect and step (f)(1) of the second aspect comprises increasing the flowrate of the initial heat extraction fluid employing an injection pump.

In certain embodiments step (h)(1) of the first aspect and step (g)(1) of the second aspect comprises increasing the pressure of the initial heat extraction fluid employing an injection pump.

In certain embodiments the methods may comprise the flowing the initial heat extraction fluid from the injector well into and through the first heat extraction stage in the subterranean geothermal formation to form a heated heat extraction fluid comprises transferring at least about 760 GJ/hr. (gigajoules/hr.) of heat from the subterranean geologic formation to the first heat extraction fluid.

In certain embodiments the methods may further comprising flowing the initial heat extraction fluid from the injector well into and through a second heat extraction stage in the subterranean geothermal formation to form a second heated heat extraction fluid wherein the flowing the initial heat extraction fluid from the injector well into and through the second heat extraction stage in the subterranean geothermal formation to form the second heated heat harvesting fluid comprises transferring at least about 730 GJ/hr. (gigajoules/hr.) of heat from the subterranean geothermal formation to the second heat extraction fluid.

In certain embodiments the initial heat extraction fluid is selected from water, brine, viscosified fluids, energizing fluids, and polymer based fluids. In certain embodiments the heat extraction fluid comprises a propping agent.

Certain embodiments may further comprise employing a computer and a computer-readable medium encoded with processing instructions to perform at least one of steps (a)-(k), wherein the computer is selected from the group consisting of a hand-held computer, a laptop computer, a desktop computer, and a tablet computer.

Computer-readable media encoded with non-transitory processing instructions for implementing one of the methods of the first and second aspects are also considered aspects of the present disclosure.

The methods and computer-readable media disclosed herein may be used in methods and systems for harvesting heat from subterranean geologic formations such as disclosed in assignee's co-pending U.S. 63,680,402, filed Aug. 7, 2024, and Patent Cooperation Treaty application no. PCT/US2025/033935. Certain embodiments of the present disclosure may comprise wherein the injector well may be cemented. In yet other systems and processes the injector well may be uncemented. Certain embodiments of the present disclosure may comprise wherein the producer well is selected from an open hole, a well comprising a cemented or an uncemented liner, and a well selectively segmented by ECP and sliding sleeves or pre-perforated liner. Certain embodiments of the present disclosure may comprise wherein the injection pump is one or more surface pumps.

In certain systems and processes of the present disclosure the injector well may be configured to utilize single-path injection through either an inner conduit or through an annulus between the inner conduit and casing, wherein the inner tubing is selected from in place tubing, drill pipe, and coiled tubing. In certain systems and processes of the present disclosure the injector well may be configured to utilize dual injection paths comprising a first injection path through an inner conduit and a second injection path through an annulus between the inner conduit and casing, and wherein the injection pump comprises a first injection pump for the first injection path and a second injection pump for the second injection path. In certain systems and processes of the present disclosure the first injection pump may be configured to pump the first heat extraction fluid through the first injection path, and the second injection pump may be configured to pump the second heat extraction fluid through the second injection path, wherein the first and second heat extraction fluids are different in one or more physical and/or chemical properties.

Certain system and process embodiments may comprise wherein the injection pump comprises one or more surface pumps. Yet other systems may comprise one or more surface pumps for a first injection path, and one or more other surface pumps for a second injection path, especially in embodiments where dual injection paths (inner conduit and annulus) are used.

Certain system and process embodiments may comprise wherein the one or more heat extraction fluids comprises a propping agent such as sand, bauxite, petroleum coke, and the like, with or without other materials, such as bridging agents.

In certain embodiments the systems and processes of the present disclosure may comprise one or more components selected from the group consisting of one or more pressure control devices, (also referred to as chokes), one or more flow measurement devices, one or more accessory equipment, and combinations thereof. In certain embodiments the one or more accessory equipment may be selected from the group consisting of one or more connectors, one or more isolation valves, and one or more pressure relief valves. In certain embodiments the one or more components may comprise one or more redundant components in the system. Certain system embodiments may comprise one or more quick connect/quick disconnect connectors.

In certain embodiments, pressure (P), temperature (T), density, and/or mass flow may be sensed inside the injector and/or producer well tubing, the annulus, the subterranean geologic formation, or any combination of these. Mass flow sensors may be employed. All combinations of sensing T, P, density, and/or mass flow in the injector and/or producer tubing or inner pipe, in the annulus, and/or in the formation are disclosed herein and considered within the present disclosure.

As used herein "completion sub-system" means a structure or structures for sealing or allowing fluid flow in a controlled manner in desired locations in the subterranean geologic formations, including into and out of injector wells, laterals, ERVs, and producer wells. In certain embodiments of the present disclosure the completion sub-system may include one or more inflatable packers, blowout preventers, plugs, downhole tools, and the like. As used herein "power generation sub-system" and "power plant" mean a structure or structures for producing electrical power, which may include, but are not limited to, knock-out drums, heat exchangers, pumps, compressors, turbine generators, electrical conduits, and liquid and vapor conduits fluidly and mechanically connected as described herein. Certain embodiments of the present disclosure may include connectivity and/or permeability measurement components and associated components, for example, but not limited to pressure control devices (backpressure valves), pressure relief devices (valves or explosion discs), pipes, conduits, vessels, towers, tanks, mass flow meters, temperature and pressure indicators, heat exchangers, pumps, compressors, and quick connect/quick disconnect (QC/QD) features for connecting and disconnecting chokes, and the like.

These and other features of the systems, processes (methods), and computer-readable media of the present disclosure will become more apparent upon review of the brief description of the drawings, the detailed description, and the claims that follow. It should be understood that wherever the term "comprising" is used herein, other embodiments where the term "comprising" is substituted with "consisting essentially of" are explicitly disclosed herein. It should be further understood that wherever the term "comprising" is used herein, other embodiments where the term "comprising" is substituted with "consisting of" are explicitly disclosed herein. Moreover, the use of negative limitations is specifically contemplated; for example, certain producer wells may be devoid of casing; certain injector wells may be devoid of dual injection paths; certain methods and systems may be devoid of an injection pump; certain heat harvesting fluids may be devoid of oils and/or other hydrocarbons, and/or devoid of carcinogenic compounds; certain proppants may be devoid of other materials.

BRIEF DESCRIPTION OF THE DRAWINGS

The manner in which the objectives of this disclosure and other desirable characteristics can be obtained is explained in the following description and attached drawings in which:

FIG. 8 is logic diagram illustrating one process in accordance with the present disclosure.

Figure 1:
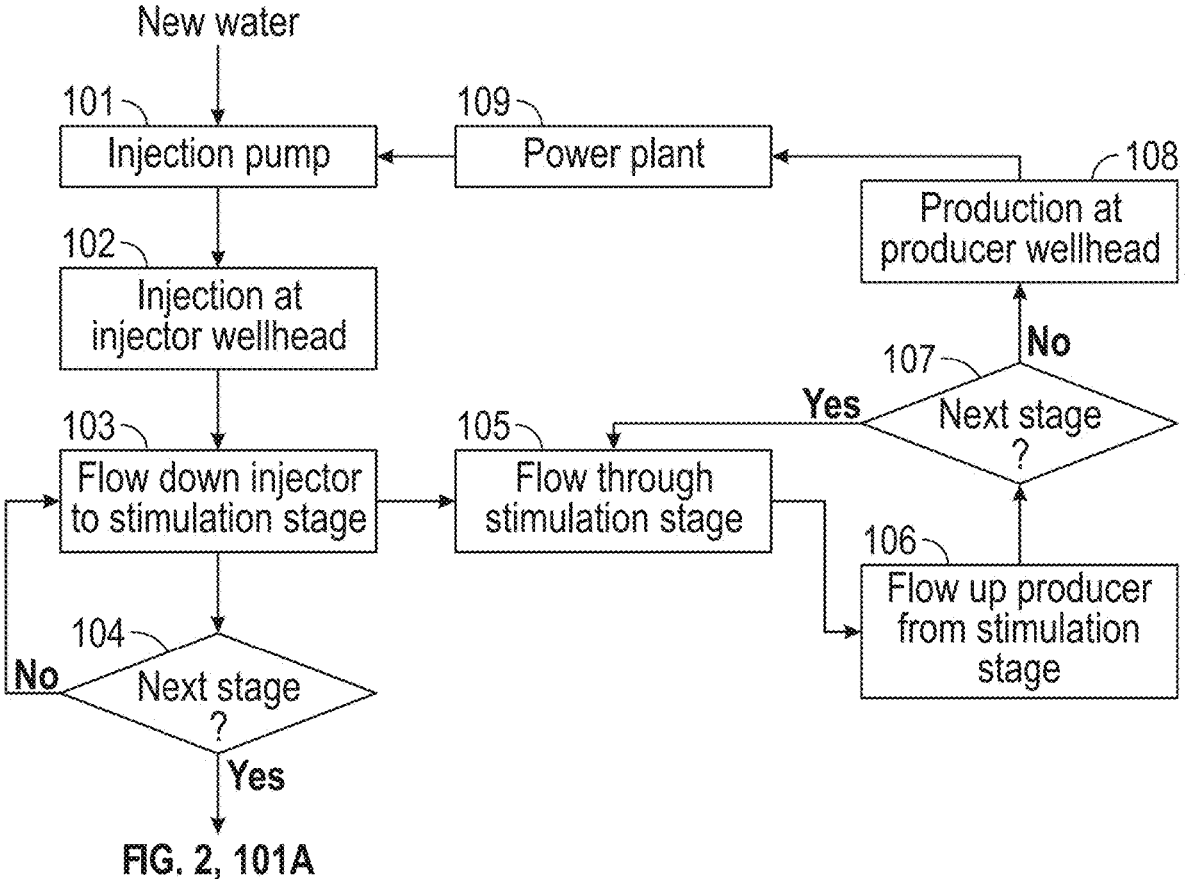
FIG. 1 is an overall logic diagram illustrating one heat harvesting algorithm embodiment useful in process embodiments in accordance with the present disclosure.

It is to be noted, however, that the appended drawings illustrate details of only several embodiments of systems, processes or methods, and computer-readable media in accordance with the present disclosure. Therefore, the drawing figures are not to be considered limiting in scope, for the disclosure may admit to other equally effective embodiments. Identical reference numerals are used throughout the several views for like or similar elements.

DETAILED DESCRIPTION

In the following description, numerous details are set forth to provide an understanding of the disclosed algorithms, processes, and computer-readable media. However, it will be understood by those skilled in the art that the systems and processes disclosed herein may be practiced without these details and that numerous variations or modifications from the described embodiments may be possible. All technical articles, published and non-published patent applications, standards, patents, statutes and regulations referenced herein are hereby explicitly incorporated herein by reference, irrespective of the page, paragraph, or section in which they are referenced. Where a range of values describes a parameter, all sub-ranges, point values and endpoints within that range or defining a range are explicitly disclosed herein. All percentages herein are by weight unless otherwise noted. In the event definitions of terms in the referenced patents and applications conflict with how those terms are defined in the present application, the definitions for those terms that are provided in the present application shall be deemed controlling. Where a range of values describes a parameter, all sub-ranges, point values and endpoints within that range are explicitly disclosed herein. This document follows the well-established principle that the words "a" and "an" mean "one or more" unless we evince a clear intent to limit "a" or "an" to "one." For example, when I state "an injector well" or "a producer well", I mean that the specification supports a legal construction of "an injector well" or "a producer well" that encompasses structure distributed among multiple physical structures, and a legal construction of "a pump" that encompasses structure distributed among multiple physical structures.

As mentioned herein, extraction of heat from geothermal energy sources such as, but not limited to, Dry Hot Rock (DHR) presents several efficiency and power advantages over other EGS or CLGS approaches for geothermal energy recovery. Heat is harvested from DRH via an Enhanced Rock Volume (ERV) built from a horizontal injector, horizontal producer, and a series of fractures connecting the injector to the producer. Heat is recovered effectively only from the ERV due to the low thermal conductivity of the rock. Long horizontal well laterals can harvest heat from a large area that is dependent on the effective area of the fractures, but the depth of recovery from the area is limited by the rock thermal conductivity. The quality of heat will diminish as this ERV is harvested. Heat in rock outside this volume is not recovered and remains to be recovered. Heat is harvested from the ERV faster than the natural geothermal gradient will replenish the heat in the volume. In fact, it can take tens to hundreds of years to replenish the heat. This means that once the heat quality harvested becomes uneconomic, the ERV should be abandoned. However, abandoning the wells because the ERV is depleted can be costly. It is beneficial to reuse the wells.

Heat outside the abandoned ERV remains unharvested. There is heat potential vertically above and below the harvested volume that can be reached by the existing wells. To address these problems, geothermal projects have started to use heat harvesting techniques that have shown successes in the O&G (oil and gas) industry to stimulate hydrocarbon-bearing formations, such as use of slickwater fracs, cross-linked fluids, limited entry, and completion designs using devices such as sleeves. These technologies have started to become prevalent in geothermal wells but do not address the fact that heat outside an abandoned ERV remains unharvested. As may be seen, current practices may not be adequate for all circumstances, and do not address the noted problems with respect to extracting heat from DHR. There remains a need for more robust systems and processes for harvesting heat from subterranean geologic formations, and in particular geothermal formations. The systems and processes of the present disclosure are directed to these needs.

As described in more detail herein with reference to the various drawing figures, systems, processes, and computer-readable media of the present disclosure address problems identified by the inventor herein, namely the lack of heat harvesting algorithms, and systems and processes employing same, for use in heat harvesting processes and systems as disclosed in assignee's co-pending U.S. 63,680,402, filed Aug. 7, 2024, and Patent Cooperation Treaty application no. PCT/US2025/033935. The inventor herein has investigated and developed solutions to these problems.

Figure 2:
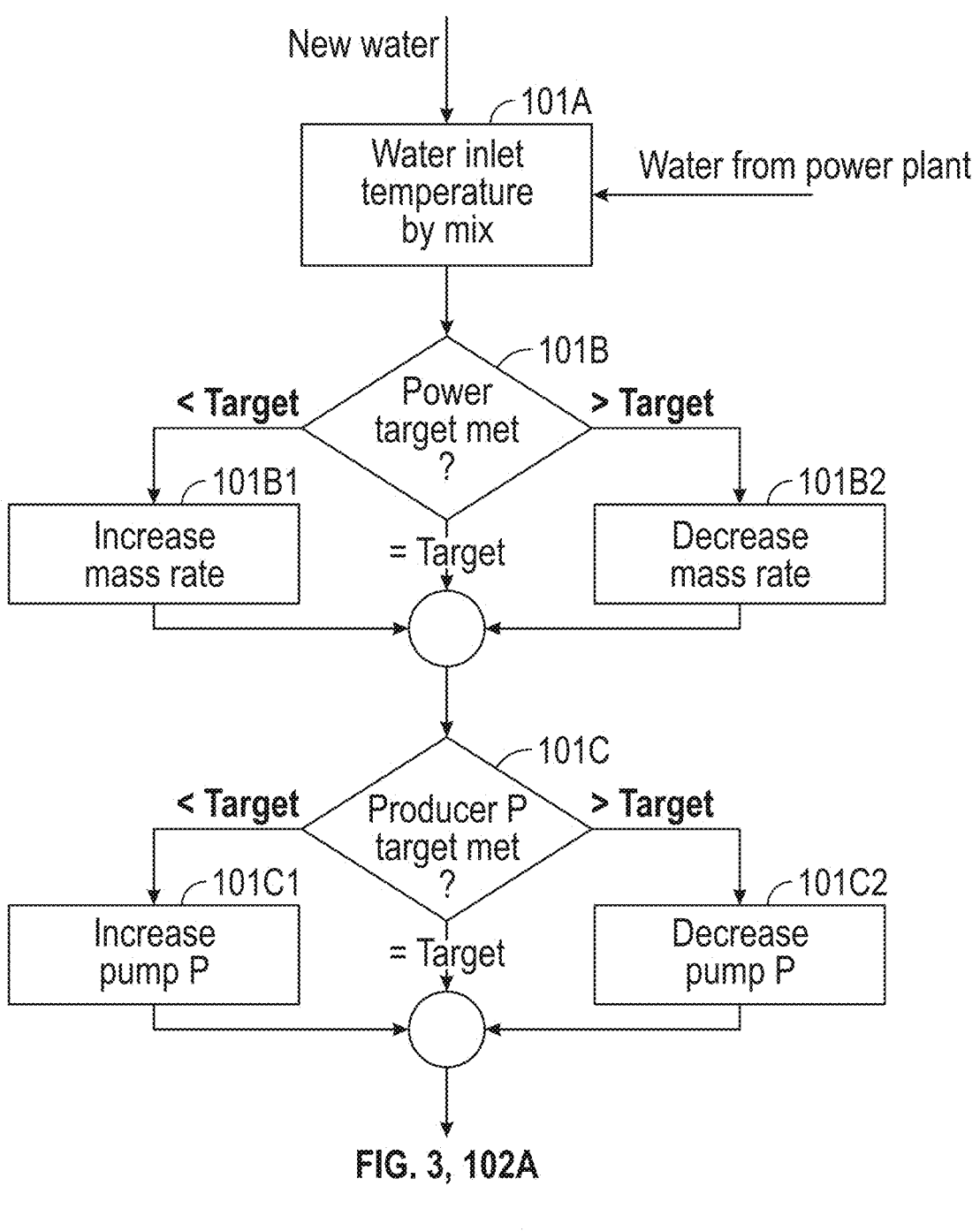
FIGS. 2-4 are logic diagrams illustrating details of the heat harvesting algorithm embodiment of FIG. 1.
Figure 3:
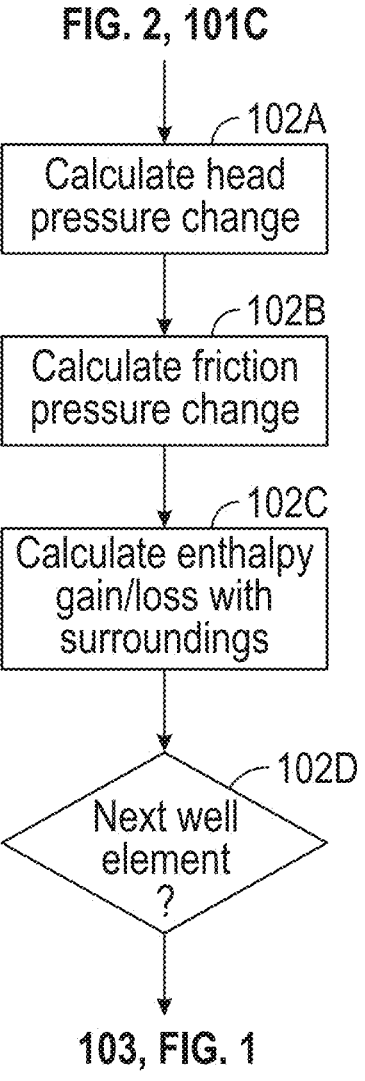
Figures 1, 4:
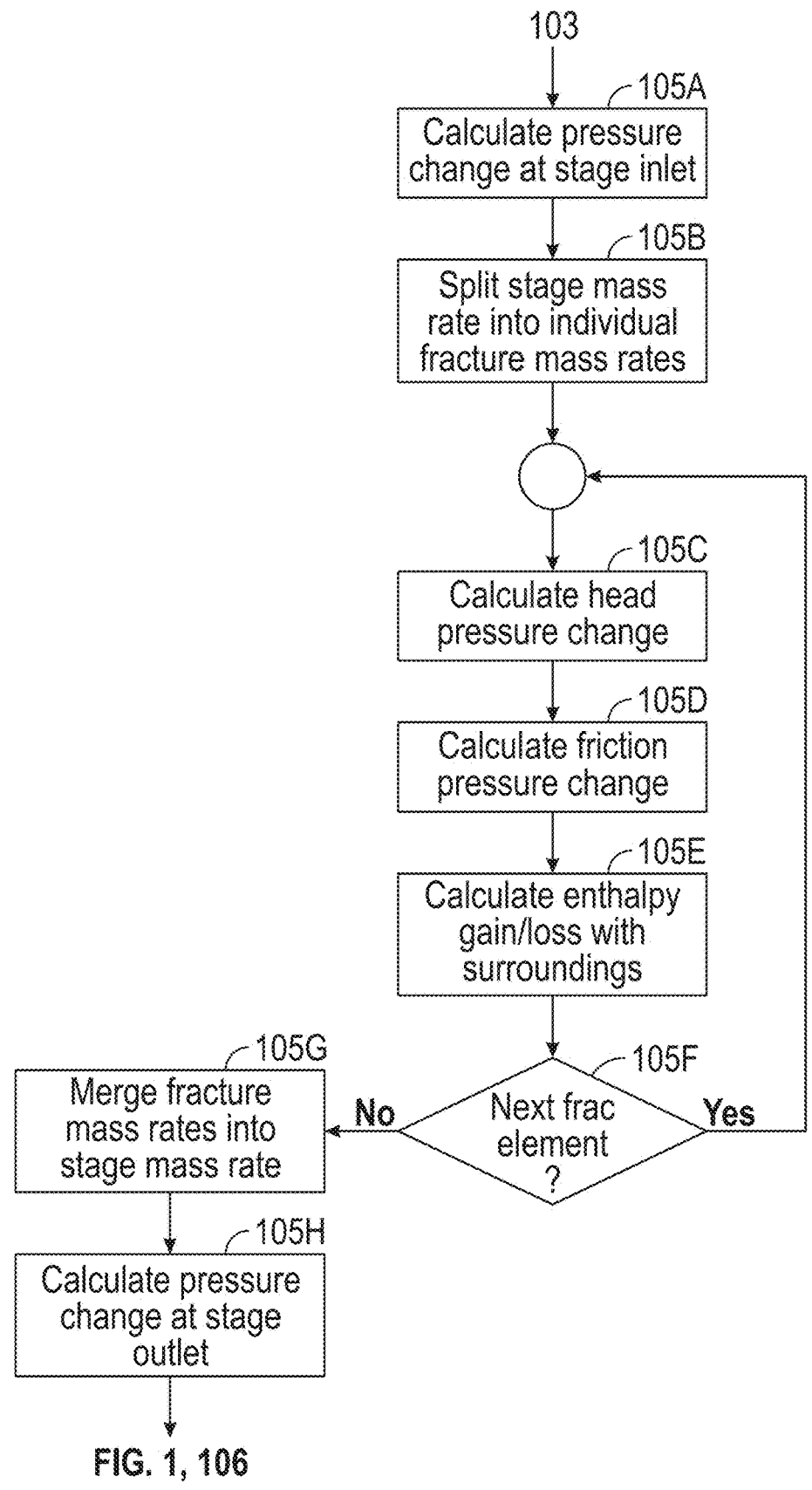

Turning now to FIGS. 1-4 of the drawing figures, FIG. 1 is an overall logic diagram illustrating one heat harvesting algorithm embodiment useful in process embodiments in accordance with the present disclosure, FIGS. 2-4 are logic diagrams illustrating details of the heat harvesting algorithm embodiment of FIG. 1. In the embodiment illustrated in FIG. 1, new water (or other heat harvesting fluid, which may be liquid, gas, or mixture thereof) enters an injection pump 101 from a water source along with water effluent from a power plant 109 to form a mixed water stream. It will be evident to those skilled in the geothermal energy heat harvesting art that certain embodiments will not require any new water to be added, and in certain embodiments pressure of water effluent from power plant 109 will be sufficient so that injection pump 101 is not required. These embodiments are considered within the present disclosure. The embodiment detailed herein assumes an injection pump is present.

Referring to the detailed logic diagram of FIG. 2, at 101A, temperature of the mixed water stream is determined by inlet water temperature from the new water source (if needed)

and temperature of effluent water from power plant 109. The lower the temperature existing at injection pump 101, the greater the percentage of the heat in place in the rock that can be recovered. Heat flows by conduction in the rock and the temperature drawdown of the rock is the driving force. At 101B, mass rate of the mixed water is set by adjustment of injection pump 101 to meet power plant 109 electrical generation requirements. Mass rate required is initially an unknown value a priori and it is solved iteratively by selecting an estimated mass rate, and asking (box 101B) if a target power generation by power plant 109 has been met. If at the end of an initial algorithm run, the power generated is less than the target (box 101B1), mass rate is increased by adjusting injection pump 101; if at the end of an initial algorithm run, the power generated is greater than the target (box 101B2), mass rate is decreased by adjusting injection pump 101.

Still referring to FIG. 2, at 101C water pressure required is also initially an unknown but is initially set to ensure minimum pressure at producer wellhead 108. Depending on the degree of thermosiphoning inherent to the superhot rock temperature, injection pressure may not be required. Water pressure required at the injector well is an unknown value a priori and it is solved iteratively. If at the end of an initial algorithm run, the producer wellhead pressure is less than the target (box 101C1), pressure of water injected is increased by adjusting injection pump 101; if at the end of an initial algorithm run, the producer wellhead pressure is greater than the target (box 101C2), pressure of water injected is decreased by adjusting injection pump 101. The maximum injection outlet pressure is set according to specifications of injection pump 101.

At 102 (FIG. 1), water enters an injection well where the inlet conditions are such that water is maintained in the liquid state throughout the injector well. In this embodiment, the injector well size and geometry are selected to flow the same mass as up to two production wells. In this algorithm, the injection well is subdivided into multiple elements where each element is solved individually. Referring to FIG. 3, at 102A, head pressure is calculated from the thermophysical properties of the water in the first element. The orientation of the first element is set from a well deviation survey. At 102B, friction pressure is calculated from a flow correlation using the thermophysical properties of water in the first element. Properties of the well itself are set from the selected injector well geometry (specification). At 102C, the injector well algorithm uses a pressure-enthalpy balance for multiphase flow. The injection water will gain heat from the surrounding rock traversed along the path to the first heat harvesting stage, or first enhanced rock volume (FERV, using terminology of PCT/US2025/033935). This heat gain is highest at initial harvest time and decreases to a lower stable rate as the harvest continues in time.

At 103 (FIG. 1), the water flows (in the algorithm) down the injector well to the first heat harvesting stage 105 where a portion of the water flows from the injector well into first heat harvesting stage 105. The mass rate the first heat harvesting stage 105 will take is unknown a priori and it is solved iteratively with a simultaneous pressure balance amongst the injector well(s), all heat harvesting ERVs, and all producer wells. At 104, the algorithm determines if a second heat harvesting stage is required; if yes, the algorithm performs the steps in FIGS. 2 and 3 for the second heat harvesting stage (and further stages, if needed) and then returns to step 103. If another heat harvesting stage is not required, the algorithm returns to step 103.

At 105 (FIG. 1), the water flows (in the algorithm) through the heat harvesting stage 105, using an effective model that solves for multiple stage configurations, including those known as Thermal Lattice™ disclosed in assignee's PCT/US2025/033935; the stage configuration itself is determined heat harvesting designers. Flow through the heat harvesting stage 105 is controlled to maintain the water in a liquid or supercritical state and never in vapor state. The algorithm uses a pressure enthalpy balance of the water in the stage with the rock supplying heat by conduction.

Referring to FIG. 4, at 105A, inlet skin pressure is calculated for the water mass rate entering heat harvesting stage 105.

At 105B, the mass rate is split between the fractures into individual fracture mass rates in the algorithm. The individual fractures within a stage are modeled with the same physical properties. Fractures with different properties are handled by additional stages.

At 105C, head pressure is calculated from the thermophysical properties of the water in each individual fracture element. The orientation of each individual fracture element is set from fracture properties.

At 105D, the friction pressure in each individual fracture element is calculated, in this algorithm embodiment, with the fracture modeled as propped using the thermophysical properties of water in each individual fracture element. The objective in this algorithm is that pressure is maintained such that the water is single phase liquid or supercritical. The mass rate per individual fracture element is limited to ensure laminar flow.

At 105E, the algorithm uses a pressure enthalpy balance to calculate harvest of heat from the rock. Heat in the rock is transferred to the heat harvesting fluid (water in this embodiment) by conductive heat flow by forced convection at each individual fracture element fracture face. The water gains enthalpy until it reaches the enthalpy of water at the temperature of the rock and maintained pressure. If the enthalpy harvest is complete, the water moves to the next element carrying the heat by advection while harvesting no more heat from the rock. At the initial time of harvest, the water gains its maximum enthalpy near the fracture entrance. As the rock cools, the length of fracture increases continuously until reaching the fracture outlet. At this time, the rock cools and the heat harvested is no longer at initial rock temperature. The heat harvested by the water is orders of magnitude greater than the local heat-flow so the rock will not recharge in the harvest time frame.

At 105F, the water flows to the next element else it exits the fracture. At 105G, the water from all fractures in the stage combine. At 105H, the outlet skin pressure is calculated and the water enters the production well.

At 106 (FIG. 1), the water enters a production well and flows upwards to the wellhead. It continues to gain mass rate in the producer at each exit from the heat harvesting stage is encountered. The producer well model uses a pressure enthalpy balance for multiphase flow to calculate the changing properties of the water as it flows. The producer well will lose heat to the surrounding rock traversed along the path to the next heat harvesting stage. The heat loss is highest at initial harvest time and decreases to a lower stable rate as the harvest continues in time. At 107, the water continues to merge with water existing 105 until no more heat harvesting stages are encountered. From that point, it flows to the wellhead. At 108, water exits the producer having harvested heat from the simulation stages. If the pressure is too low, the injection pump is set a higher pressure, and the algorithm solved again. If the temperature is too low, the injection mass rate is decreased, and the algorithm is solved again. If either the defined minimum pressure or temperature cannot be met, the algorithm is stopped. If the harvested heat is too low, the injection pump mass rate is increased, and the algorithm is solved again. The process is the same as 102 with the flow from bottomhole to wellhead.

At 109 (FIG. 1), an effective power algorithm converts megawatts of thermal energy to megawatts of electrical energy. The algorithm determines the plant efficiency based on the production water's enthalpy, pressure, and temperature. The water at this point can be multiphase.

Figure 5:
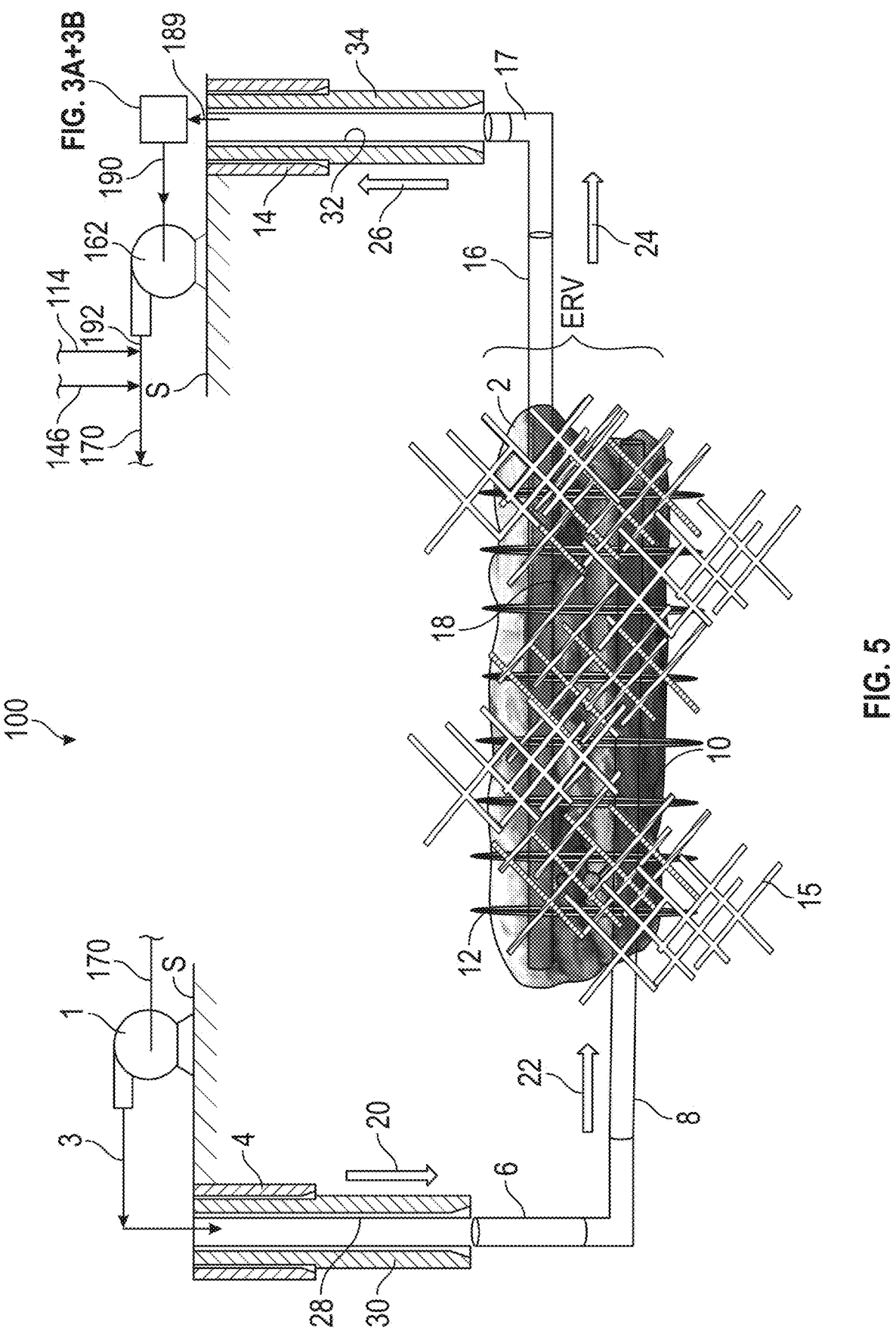
FIG. 5 is a schematic illustration view of a subterranean geologic formation enhanced rock volume (ERV), an injector well, and a production well that may be used in heat harvesting in accordance with one embodiment of the present disclosure.

FIGS. 5, 6, 7A, 7B, and 8 herein are as disclosed in assignee's PCT/US2025/033935 as FIGS. 1, 2, 3A, 3B, and 4, and are included here for completeness. FIG. 5 is a schematic perspective illustration view of one system and process embodiment 100 that may benefit from the heat harvester algorithms in accordance with the present disclosure, illustrating schematically a subterranean geologic formation 2 with an ERV, a vertical injector well 4, and a vertical production well 14. An injection pump 1 on the surface "S" receives feed heat extraction fluid (sometimes referred to herein as "extraction fluid" or simply "fluid") via a conduit 170, pump 1 feeding the extraction fluid via an extraction fluid injection conduit 3 into injector well 4, through a vertical or deviated section 6 and a first perforated injector horizontal lateral 8 into subterranean geologic formation 2. Horizontal lateral has been previously perforated, with a plurality of perforations indicated at 10. A plurality of fluid plumes of extraction fluid 12 flowing out of the plurality of perforations 10 in subterranean geologic formation 2 are indicated in FIG. 5, as are natural seams or cracks 15 in subterranean geologic formation 2.

Still referring to FIG. 5, a first perforated production horizontal lateral 16 having a plurality of perforations 18 is fluidly and mechanically connected to a vertical and/or deviated section 17 of production well 14. Injector well 4 includes, in embodiment 100, casing 28 which is cemented at 30. Producer well 14 includes, in embodiment 100, casing 32 which is cemented at 34. Embodiment 100 further features a conduit 189 routing warmed extraction fluid to a surface power generation sub-system as further explained with reference to FIGS. 7A and 7B. A conduit 190 routes cooled, collected heat extraction fluid and feeds an extraction fluid extraction pump 162, which through conduits 192, 146, and 114 and 170 returns extraction fluid to injection fluid injection pump 1.

Arrows 20, 22, 24, and 26 in FIG. 5 indicate direction of flow of extraction fluid in embodiment 100:

arrow 20 indicates flow direction of cool extraction fluid in injector well 4 and vertical section 6;

arrow 22 indicates flow direction of cool extraction fluid in first perforated injector horizontal lateral 8;

arrow 24 indicates flow direction of warm extraction fluid in first perforated production horizontal lateral 16; and arrow 26 indicates flow direction of warm extraction fluid in production well vertical section 17 and production well 14.

Figure 6:
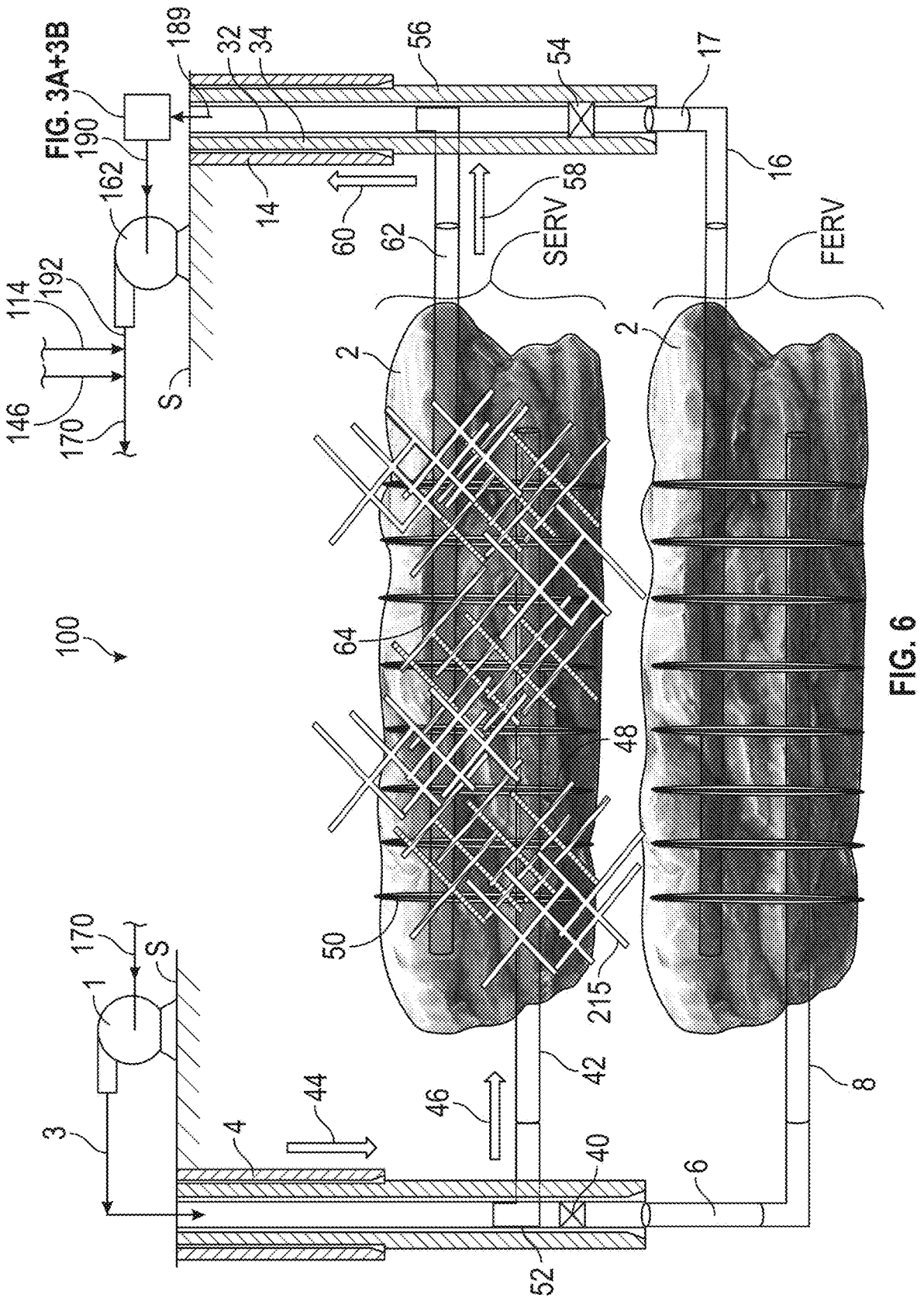
FIG. 6 is a schematic illustration view of the system of FIG. 5 after completing the injector and production wells a second time for forming a second enhanced rock volume (SERV), where the ERV in FIG. 5 is the first enhanced rock volume (FERV)

Referring now to FIG. 6, in order to harvest heat from a second ERV ("SERV") located outside of the first ERV ("FERV"), embodiment 100 further features an inflatable packer, BOP, or other completion sub-system component 40 in injector well 4, and inflatable packer, BOP, or other completion sub-system component 54 in producer well 14. A second perforated injector horizontal lateral 42, having plurality of perforations 48, is fluidly and mechanically connected to injector well 4 at position 52 in injector well 4, while a second perforated producer well horizontal lateral 62, having a plurality of perforations 64, is fluidly and mechanically connected to producer well 14 at location 56 in producer well 14. A plurality of fluid plumes of extraction fluid 50 flowing out of the plurality of perforations 64 in subterranean geologic formation 2 are indicated in FIG. 2, as are natural seams or cracks 215 in subterranean geologic formation 2.

Similar to arrows 20, 22, 24, and 26 in FIG. 5 indicating direction of flow of extraction fluid in the FERV, arrows 44, 46, 58, and 60 in FIG. 6 indicate direction of flow of extraction fluid in the SERV of embodiment 100:

arrow 44 indicates flow direction of cool extraction fluid in injector well 4;

arrow 46 indicates flow direction of cool extraction fluid in second perforated injector horizontal lateral 42;

arrow 58 indicates flow direction of warm extraction fluid in second perforated production horizontal lateral 62; and arrow 60 indicates flow direction of warm extraction fluid in production well 14.

Figure 7A:
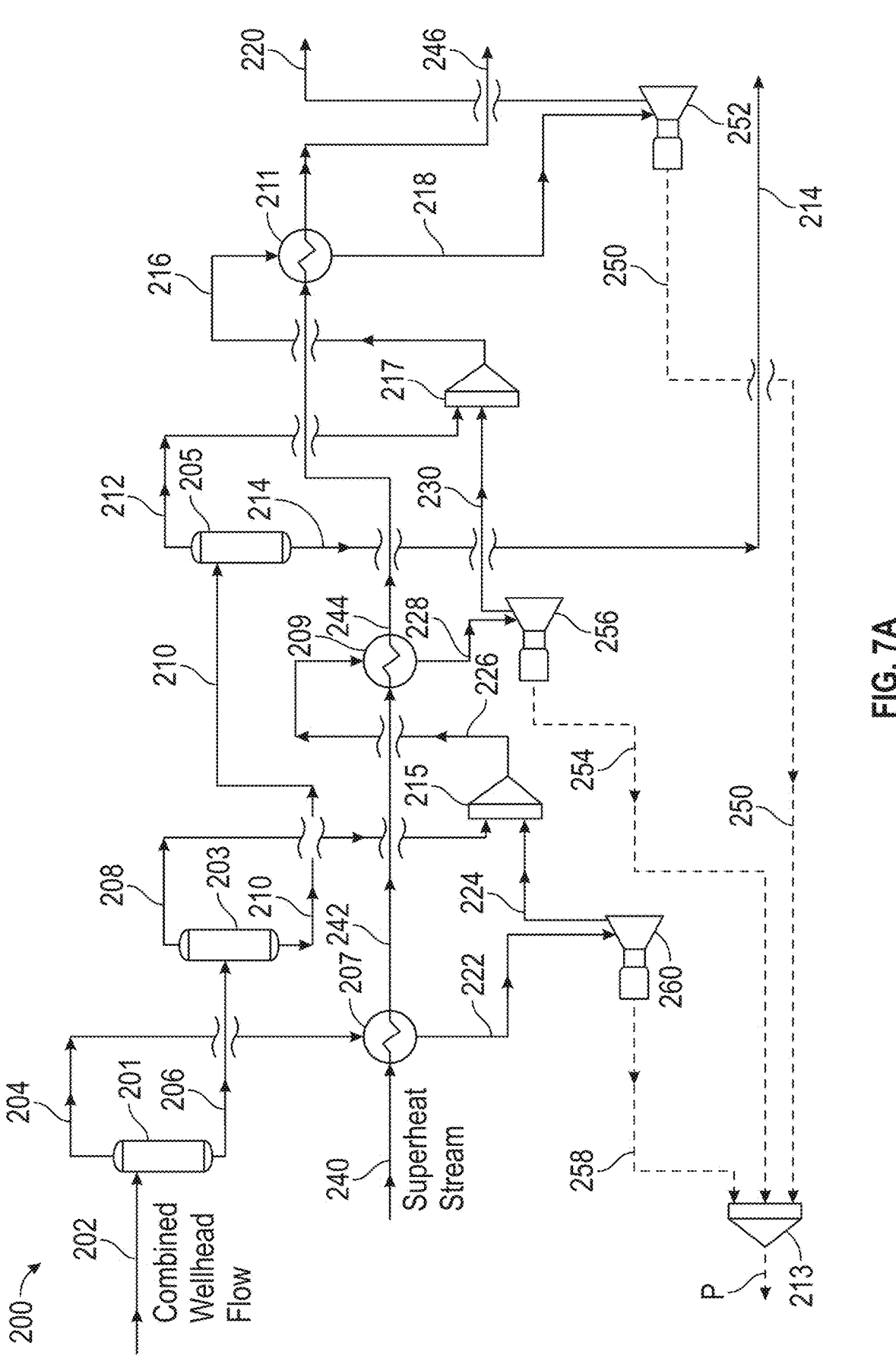
FIGS. 7A and 7B are schematic process flow diagrams of one embodiment of a surface power generation sub-system and process for generating electricity from heat harvested using systems and processes of the present disclosure.
Figure 7B:
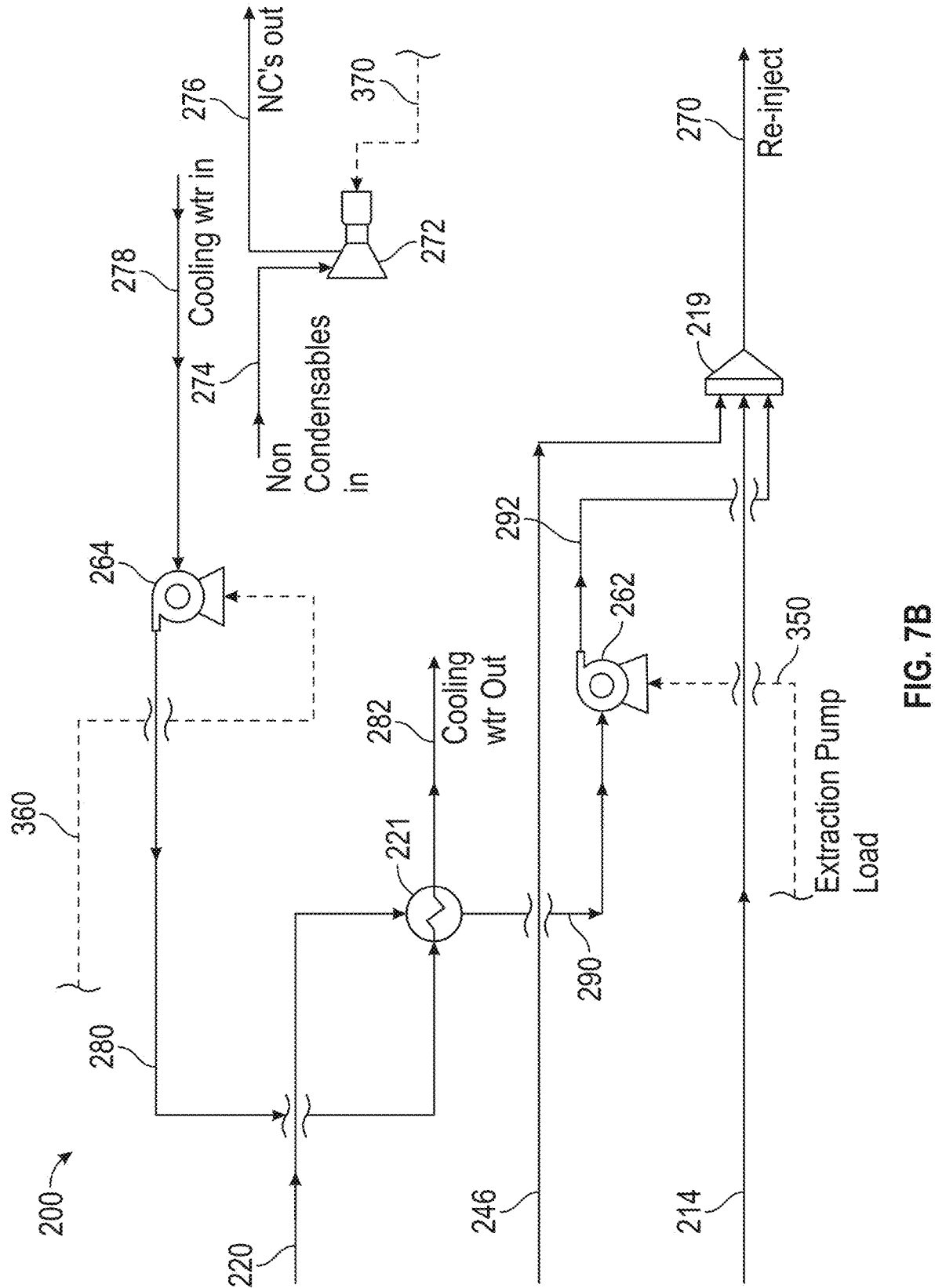

FIGS. 7A and 7B illustrate schematically a process flow diagram of one embodiment 200 of a surface power generation sub-system of systems and processes of the present disclosure. Embodiment 200 includes a first knock-out drum 201, as second knock-out drum 203, and a third knock-out drum 205. (The term "knock-out" is commonly abbreviated as "KO".) KO drum 201 receives a combined wellhead flow from producer well(s) 14 via conduit 202 and produces an extraction fluid vapor stream through a conduit 204 from first KO drum 201, which fluidly and mechanically connects first KO drum 201 to a primary heat exchanger 207, and a liquid extraction fluid stream through conduit 206 from first KO drum 201, which fluidly and mechanically connects first KO drum 201 to second KO drum 203. Second KO drum 203 produces a second extraction fluid vapor stream through a conduit 208, which fluidly and mechanically connects second KO drum 203 to a first extraction fluid vapor collection chamber 215, and a second liquid extraction fluid stream through conduit 210, which fluidly and mechanically connects second KO drum 203 to third KO drum 205. Similarly, third KO drum 205 produces a third extraction fluid vapor stream through a conduit 212, which fluidly and mechanically connects third KO drum 205 to a second extraction fluid vapor collection chamber 217, and a third liquid extraction fluid stream through conduit 214, which fluidly and mechanically connects third KO drum 205 to an extraction fluid liquid collection chamber 219 (FIG. 7B).

Referring still to FIGS. 7A and 7B, a cool collected vapor conduit 216 fluidly and mechanically connects second extraction fluid vapor collection chamber 217 with a tertiary heat exchanger 211, and conduit 218 fluidly and mechanically connects tertiary heat exchanger 211 a first turbine generator 252, which produces electricity 250 (dashed line). Conduit 220 fluidly and mechanically connects first turbine generator 252 with a warm collected extraction fluid vapor condenser 221.

Still referring to FIGS. 7A and 7B, conduit 222 routes extraction fluid vapor heated by primary heat exchanger 207 to a third turbine generator 260 that produces electricity 258 (dashed line). Conduit 224 routes reduced pressure and temperature extraction fluid vapor to first extraction fluid vapor collection chamber 215, which in turn routes a combined extraction fluid vapor to a secondary heat exchanger 209 via a conduit 226, while conduit 228 routes heated extraction fluid vapor to a second turbine generator 256, producing electricity 254 (dashed line). Conduit 230 routes reduced pressure and temperature vapor stream from second turbine generator 256 to second extraction fluid vapor collection chamber 217. Electricity flowing in power lines 250, 254, and 258 is gathered in electricity accumulator 213 and used as power P in the sub-system and/or routed to an electrical grid and/or to electricity storage facility.

In one heat harvest, a combined wellhead flow in conduit 202, having a temperature of about 250° C. (480° F.), and using superheated steam as auxiliary heat, produced 25,120 kW from turbine generator 252; 15,180 kW from turbine generator 256; and 4,868 kW from turbine generator 260, for a total combined 45,170 kW of electricity produced. Extraction pump 262 used 24.06 kW; cooling water pump 264 used 680.5 kW; and non-condensable gas compressor 272 used 1,178 kW. The reinjected extraction fluid in conduit 270 ranged from about 50 to about 120° C. (120 to 250° F.). Temperatures, pressures, and flow rates (mass or volume) of the various streams, for example, the steam and "heat extraction fluid" flowing into and out of the heat exchangers, will vary depending upon the subterranean geologic formation 2 with one or more ERVs, number and quality of injector well(s) 4, and number and quality of producer well(s) 14.

Embodiment 200 includes using superheated steam to augment the heat harvested with the extraction fluid. Superheated steam conduit 240 routes superheated steam to primary heat exchanger 207, producing a first intermediate pressure steam that is routed via a conduit 242 from primary heat exchanger 207 to secondary heat exchanger 209. Another conduit 244 routes a second intermediate pressure steam from secondary heat exchanger 209 to tertiary heat exchanger 211, and tertiary heat exchanger produces a low pressure steam and/or steam condensate stream which is routed via conduit 246 to extraction fluid liquid collection chamber 219.

Embodiment 200 further includes previously mentioned extraction fluid extraction pump 262, cooling water supply pump 264, and a non-condensable gases compressor 272. Non-condensable gases compressor 272 receives a flow of non-condensable gases from condenser 221 or a KO drum plumed thereto (not illustrated) via conduit 274 and discharges a higher pressure non-condensable composition via conduit 276, discharging to atmosphere or to a gas environmental cleanup facility (not illustrated) if required by local government regulations. Cooling water pump 264 receives a supply of cooling water via a conduit 278 and discharges cooling water via a conduit 280, through which cooling water traverses to extraction fluid vapor condenser 221. Warmed cooling water exits condenser 221 via conduit 282 and may be routed to a cooling tower or other water cooling facility (not illustrated). Extraction fluid extraction pump 262 receives condensed extraction fluid vapor via conduit 290 and discharges through another conduit 292 which further connects to extraction fluid liquid collection chamber 219. Electricity is supplied to pumps 262 and 264, and to compressor 272 via electrical conduits 350, 360, and 370, respectively.

Referring now to FIG. 8, a logic diagram is presented for illustrating one process embodiment 300 in accordance with the present disclosure. Process embodiment 300 is a process for harvesting heat from subterranean geologic formations (box 302), comprising:

a) completing an injector well paired with one or more production wells for forming a first enhanced rock volume (FERV), the injector well having a first perforated injector horizontal lateral, and the one or more production wells having a first perforated production horizontal lateral above the first perforated injector horizontal lateral (box 304);

b) harvesting heat from the FERV by pumping a first fluid at a first temperature (T1), a first pressure (P1), and at a first rate (R1) into the injector well and through the first perforated injector horizontal lateral and its perforations, the first fluid contacting the FERV, transferring heat from the FERV to the first fluid to form a heated first fluid at a second temperature (T2), the first pressure (P1) sufficient to force the heated first fluid through the first perforated production horizontal lateral and the one or more production wells (box 306);

c) moving up or down hole in the injector well and building a second enhanced rock volume (SERV) by completing the injector well a second time paired with the one or more production wells for forming a second enhanced rock volume (SERV), the injector well having a second perforated injector horizontal lateral, and the one or more production wells having a second perforated production horizontal lateral above the second perforated injector horizontal lateral (box 308);

d) harvesting heat from the SERV by pumping a second fluid at a third temperature (T3), a second pressure (P2), and at a second rate (R2) into the injector well and through the second perforated injector horizontal lateral and its perforations, the second fluid contacting the SERV, transferring heat from the SERV to the second fluid to form a heated second fluid at a fourth temperature (T4), the second pressure (P2) sufficient to force the heated second fluid through the second perforated production horizontal lateral and the one or more production wells (box 310); and e) repeating steps (c) and (d) at least once (box 312).

Injector pumps, if needed, are well-known and available from various commercial suppliers, including NOV, SLB, Halliburton, Baker Hughes, and others.

The heat extraction fluid may further include propping agents, such as natural sands, bauxite particles, ceramic particles, petroleum coke particles, and the like, which tend to maintain fractures open. A combination of fluids may be employed, and a single-path or dual-path injection strategy may be used, such as one pump creating a first flow of a first fluid in the tubing of an injector well and/or a producer well, and a second pump creating a second flow of a second fluid in the annulus of an injector well and/or a producer well. One or more production wells extend from the surface to the subterranean geologic formation, wherein the production well can be an open hole, or cemented or uncemented liner, or selectivity segmented by ECP and sliding sleeves or pre-perforated liner.

Heat extraction fluids for extracting heat from host rock may be selected from water, brine, energizing fluids or polymer-based fluids, and may be accomplished through dual injection paths between tubing and annulus in the injector well depending on intensity and reservoir rock desired location. The tubing may be tubing in place, drill pipe, or coiled tubing. Jetting nozzles may be utilized for creating wellbore to rock fluid flow connections (connected paths). An angular abrasive material may be employed to achieve erosion and breakthrough the tubular materials separating jet nozzle tool and host rock. Dual injection in the tubing and annulus for generation of tensile fractures at desired depth may be accomplished using propping agents such as sand, bauxite and petroleum coke particles in sequences pertaining to a desired design.

Operationally, the injector pump or pumps may operate at up to 20,000 psi pump pressure rating typical for land rigs.

Certain embodiments may include specialized equipment, such as high pressure pumps, coiled tubing rigs, and combinations thereof. Standpipe pressure (SPP) above 15,000 psi is considered extreme. For this case study, we notionally target between 3,000 psi and 10,000 psi standpipe pressure.

Control devices may comprise a combination of: one or more pressure control devices, also referred to as chokes; one or more temperature control devices; one or more heat extraction fluid pumping devices; one or more flow measurement devices (also referred to herein as mass flow meters or mass flow sensors); and in certain embodiments one or more accessory equipment such as one or more connectors, one or more isolation valves, one or more pressure relief devices, among others. The specific configuration of the well, drillstring, and completions define the capabilities of each system and process embodiments. Redundancy of components may allow for extended service periods and mitigates risk of downtime due to component failure. An example would be a packer failure. In this case, isolating the failed component and enabling another one allows for continued operations, and enables evaluation and/or modification of the operational parameters to minimize the risk of failure of the new component in use.

A dedicated contingency pressure control device may be used to quickly react to sudden increases in pressure, potentially due to one or more operational pressure control devices plugging with drilled cuttings, or other reasons. This contingency pressure control device may be controlled by an automated system to open and regulate a maximum pressure set point providing time to enable additional flow paths to bypass the blocked component, if available, or to stop operations to correct the deviation.

A mass flow meter may enable monitoring the fluid (liquid and/or vapor) flow rates, and aid in comparison of fluid flow and density out of the producer well against fluid flow and density being pumped into the injector well.

During operation, one or all of T, P, mass flow rate, gas or vapor concentrations (or percentages of set point values) inside and/or outside the tubing and in the annulus may be displayed locally on Human Machine Interface (HMI), such as a laptop computer having display screen having a graphical user interface (GUI), or handheld device, or similar. In certain embodiments the HMI may record and/or transmit the data via wired or wireless communication to another HMI, such as a laptop, desktop, or hand-held computer or display. These communication links may be wired or wireless.

One or more control strategies may be employed. A pressure process control scheme may be employed, for example in conjunction with the pressure control devices and mass flow controllers. A master controller may be employed, but the disclosure is not so limited, as any combination of controllers could be used. Programmable logic controllers (PLCs) may be used.

Control strategies may be selected from proportional-integral (PI), proportional-integral-derivative (PID) (including any known or reasonably foreseeable variations of these), and may compute a residual equal to a difference between a measured value and a set point to produce an output to one or more control elements. The controller may compute the residual continuously or non-continuously. Other possible implementations of the disclosure are those wherein the controller comprises more specialized control strategies, such as strategies selected from feed forward, cascade control, internal feedback loops, model predictive control, neural networks, and Kalman filtering techniques.

Injector wells, producer wells, pumps, and other components described herein may be built to meet ISO standards, Det Norske Veritas (DNV) standards, American Bureau of Standards (ABS) standards, American Petroleum Institute (API) standards, and/or other standards.

In certain embodiments, internal algorithms in the logic device, such as a PLC, may calculate a rate of increase or decrease in pressure inside the tubing and/or annulus. This may then be displayed or audioed in a series of ways such as "percentage to shutdown" lights or sounds, and the like on one or more GUIs. In certain embodiments, an additional function within a HMI may be to audibly alarm when the calculated pressure rate of increase or decrease reaches a level set by the operator. In certain embodiments this alarm may be sounded at the well site, as well as remote from the well site, for example in a shipboard control room, or remote control room.

What has not been recognized or realized are systems and processes employing algorithms, and non-transitory computer-readable media for efficient, long-term heat harvesting in subterranean geologic formations, in particular geothermal formations. Thus, the systems, sub-systems, processes and non-transitory computer-readable media described herein afford ways to assist, model, and perform heat harvesting in a subterranean geologic formations efficiently, safely and economically, and with significantly reduced risk of injury and discomfort to site workers and the public.

From the foregoing detailed description of specific embodiments, it should be apparent that patentable systems, sub-systems and processes have been described, including algorithms for use therein. Although specific embodiments of the disclosure have been described herein in some detail, this has been done solely for the purposes of describing various features and aspects, and is not intended to be limiting with respect to their scope. It is contemplated that various substitutions, alterations, and/or modifications, including but not limited to those implementation variations which may have been suggested herein, may be made to the described embodiments without departing from the scope of the appended claims. For example, some systems, sub-systems, and processes of this disclosure may be devoid of certain components and/or features, and/or use different order of calculation: for example, systems devoid of casing; algorithms where power produced would meet a power target produced by the geothermal power plant at the temperature, pressure, and flow rate of the initial heat extraction fluid occurs prior to selecting a specific injector well geometry; or algorithms where determining if a producer well pressure would meet a producer well pressure target occurs prior to selecting a specific injector well geometry.

What is claimed is:

1. A method comprising:
a) selecting a subterranean geothermal formation;
b) selecting an amount and temperature of effluent heat extraction fluid from a geothermal power plant producing power from the subterranean geothermal formation, the effluent heat extraction fluid having an effluent fluid pressure;
c) selecting an amount and temperature of new heat extraction fluid from a fluid source;
d) mixing the effluent heat extraction fluid and the new heat extraction fluid to form an initial heat extraction fluid having an initial heat extraction fluid temperature and pressure;
e) selecting a flowrate of the initial heat extraction fluid;
f) selecting an injector well geometry and calculating head pressure change, friction pressure change, and enthalpy gain or loss with the subterranean geothermal formation in which the injector well is positioned for the injector well geometry and the initial heat extraction fluid temperature, pressure and flowrate;
g) determining if power produced would meet a power target produced by the power plant at the temperature, pressure, and flow rate of the initial heat extraction fluid, and
1) If the power produced is less than the power target, increasing flowrate of the initial heat extraction fluid, and repeating steps (e), (f), and (g);
2) If the power produced is more than the power target, decreasing flowrate of the initial heat extraction fluid, and repeating steps (e), (f), and (g);
3) If the power produced equals the power target, proceed to step (h);
h) determining if a producer well pressure would meet a producer well pressure target,
1) If the producer well pressure is less than the pressure target, increasing the initial heat extraction fluid pressure, and repeating steps (e)-(h);
2) If the producer well pressure is more than the pressure target, decreasing the initial heat extraction fluid pressure, and repeating steps (e)-(h);
3) If the producer well pressure equals the pressure target, proceed to step (i);
i) flowing the initial heat extraction fluid from the injector well into and through a first heat extraction stage in the subterranean geothermal formation to form a heated heat extraction fluid;
j) determining whether a second heat extraction stage is required to meet the power target, and if no, proceed to step (k), and if yes, repeat steps (e)-(i);
k) flowing the heated heat harvesting fluid through the producer well to a producer wellhead and then to the power plant.

2. The method of claim 1, wherein the subterranean geothermal formation comprises dry hot rock (DHR).

3. The method of claim 1, wherein the step (g)(1) comprises increasing the flowrate of the initial heat extraction fluid employing an injection pump.

4. The method of claim 1, wherein the step (h)(1) comprises increasing the pressure of the initial heat extraction fluid employing an injection pump.

5. The method of claim 1, wherein the flowing the initial heat extraction fluid from the injector well into and through the first heat extraction stage in the subterranean geothermal formation to form a heated heat extraction fluid comprises transferring at least about 760 GJ/hr. (gigajoules/hr.) of heat from the subterranean geologic formation to the first heat extraction fluid.

6. The method of claim 1, further comprising flowing the initial heat extraction fluid from the injector well into and through a second heat extraction stage in the subterranean geothermal formation to form a second heated heat extraction fluid wherein the flowing the initial heat extraction fluid from the injector well into and through the second heat extraction stage in the subterranean geothermal formation to form the second heated heat harvesting fluid comprises transferring at least about 730 GJ/hr. (gigajoules/hr.) of heat from the subterranean geothermal formation to the second heat extraction fluid.

7. The method of claim 1, wherein the initial heat extraction fluid is selected from water, brine, viscosified fluids, energizing fluids, and polymer based fluids.

8. The method of claim 1, wherein the heat extraction fluid comprises a propping agent.

9. The method of claim 1, further comprising employing a computer and a computer-readable medium encoded with processing instructions to perform at least one of steps (a)-(k), wherein the computer is selected from the group consisting of a hand-held computer, a laptop computer, a desktop computer, and a tablet computer.

10. A method comprising:

a) selecting a subterranean geothermal formation;

b) selecting an amount and temperature of effluent heat extraction fluid from a geothermal power plant producing power from the subterranean geothermal formation, the effluent heat extraction fluid having an effluent fluid pressure;

c) selecting an amount and temperature of new heat extraction fluid from a fluid source;

d) mixing the effluent heat extraction fluid and the new heat extraction fluid to form an initial heat extraction fluid having an initial heat extraction fluid temperature and pressure;

e) selecting a flowrate of the initial heat extraction fluid;

f) determining if power produced would meet a power target produced by the geothermal power plant at the temperature, pressure, and flow rate of the initial heat extraction fluid, and 1) If the power is less than the power target, increasing the flowrate of the initial heat extraction fluid, and repeating steps (e) and (f);

2) If the power is more than the power target, decreasing the flowrate of the initial heat extraction fluid, and repeating steps (e) and (f);

3) If the power equals the power target, proceed to step (g);

g) determining if a producer well pressure would meet a pressure target, 1) if the producer well pressure is less than the pressure target, increasing the pressure of the initial heat extraction fluid, and repeating steps (e), (f), and (g);

2) If the producer well pressure is more than the pressure target, decreasing the pressure of the initial heat extraction fluid, and repeating steps (e), (f), and (g);

3) If the pressure target is met, proceed to step (h);

h) selecting an injector well geometry and calculating head pressure change, friction pressure change, and enthalpy gain or loss with the subterranean geothermal formation in which the injector well is positioned for the injector well geometry and the initial heat extraction fluid temperature, pressure and flowrate;

i) flowing the initial heat extraction fluid from the injector well into and through a first heat harvesting stage in the subterranean geothermal formation to form a heated heat extraction fluid;

j) determining whether another heat extraction stage is required to meet the power target, and if no, proceed to step (k), and if yes, repeat steps (e)-(j);

k) flowing the heated heat extraction fluid through the producer well to a producer wellhead and then to the power plant.

11. The method of claim 10, wherein the subterranean geothermal formation comprises dry hot rock (DHR).

12. The method of claim 10, wherein the step (g)(1) comprises increasing the flowrate of the initial heat extraction fluid employing an injection pump.

13. The method of claim 10, wherein the step (h)(1) comprises increasing the pressure of the initial heat extraction fluid employing an injection pump.

14. The method of claim 10, wherein the flowing the initial heat extraction fluid from the injector well into and through the first heat extraction stage in the subterranean geothermal formation to form a heated heat extraction fluid comprises transferring at least about 760 GJ/hr. (gigajoules/ hr.) of heat from the subterranean geologic formation to the first heat extraction fluid.

15. The method of claim 10, further comprising flowing the initial heat extraction fluid from the injector well into and through a second heat extraction stage in the subterranean geothermal formation to form a second heated heat extraction fluid wherein the flowing the initial heat extraction fluid from the injector well into and through the second heat extraction stage in the subterranean geothermal formation to form the second heated heat harvesting fluid comprises transferring at least about 730 GJ/hr. (gigajoules/hr.) of heat from the subterranean geothermal formation to the second heat extraction fluid.

16. The method of claim 10, wherein the initial heat extraction fluid is selected from water, brine, viscosified fluids, energizing fluids, and polymer based fluids.

17. The method of claim 10, wherein the heat extraction fluid comprises a propping agent.

18. The method of claim 10, further comprising employing a computer and a computer-readable medium encoded with processing instructions to perform at least one of steps (a)-(k), wherein the computer is selected from the group consisting of a hand-held computer, a laptop computer, a desktop computer, and a tablet computer.

19. A computer-readable medium encoded with non-transitory processing instructions for implementing a method, the method comprising:

a) selecting a subterranean geothermal formation;

b) selecting an amount and temperature of effluent heat extraction fluid from a geothermal power plant producing power from the subterranean geothermal formation, the effluent heat extraction fluid having an effluent fluid pressure;

c) selecting an amount and temperature of new heat extraction fluid from a fluid source;

d) mixing the effluent heat extraction fluid and the new heat extraction fluid to form an initial heat extraction fluid having an initial heat extraction fluid temperature and pressure;

e) selecting a flowrate of the initial heat extraction fluid;

f) selecting an injector well geometry and calculating head pressure change, friction pressure change, and enthalpy gain or loss with the subterranean geothermal formation in which the injector well is positioned for the injector well geometry and the initial heat extraction fluid temperature, pressure and flowrate;

g) determining if power produced would meet a power target produced by the power plant at the temperature, pressure, and flow rate of the initial heat extraction fluid, and 1) If the power produced is less than the power target, increasing flowrate of the initial heat extraction fluid, and repeating steps (e), (f), and (g);

2) If the power produced is more than the power target, decreasing flowrate of the initial heat extraction fluid, and repeating steps (e), (f), and (g);

3) If the power produced equals the power target, proceed to step (h);

h) determining if a producer well pressure would meet a producer well pressure target, 1) If the producer well pressure is less than the pressure target, increasing the initial heat extraction fluid pressure, and repeating steps (e)-(h);

2) If the producer well pressure is more than the pressure target, decreasing the initial heat extraction fluid pressure, and repeating steps (e)-(h);

3) If the producer well pressure equals the pressure target, proceed to step (i);

i) flowing the initial heat extraction fluid from the injector well into and through a first heat extraction stage in the subterranean geothermal formation to form a heated heat extraction fluid;

j) determining whether a second heat extraction stage is required to meet the power target, and if no, proceed to step (k), and if yes, repeat steps (e)-(i);

k) flowing the heated heat harvesting fluid through the producer well to a producer wellhead and then to the power plant.

20. A computer-readable medium encoded with non-transitory processing instructions for implementing a method, the method comprising:

a) selecting a subterranean geothermal formation;

b) selecting an amount and temperature of effluent heat extraction fluid from a geothermal power plant producing power from the subterranean geothermal formation, the effluent heat extraction fluid having an effluent fluid pressure;

c) selecting an amount and temperature of new heat extraction fluid from a fluid source;

d) mixing the effluent heat extraction fluid and the new heat extraction fluid to form an initial heat extraction fluid having an initial heat extraction fluid temperature and pressure;

e) selecting a flowrate of the initial heat extraction fluid;

f) determining if power produced would meet a power target produced by the geothermal power plant at the temperature, pressure, and flow rate of the initial heat extraction fluid, and 1) If the power is less than the power target, increasing the flowrate of the initial heat extraction fluid, and repeating steps (e) and (f);

2) If the power is more than the power target, decreasing the flowrate of the initial heat extraction fluid, and repeating steps (e) and (f);

3) If the power equals the power target, proceed to step (g);

g) determining if a producer well pressure would meet a pressure target,

1) If the producer well pressure is less than the pressure target, increasing the pressure of the initial heat extraction fluid, and repeating steps (e), (f), and (g);

2) If the producer well pressure is more than the pressure target, decreasing the pressure of the initial heat extraction fluid, and repeating steps (e), (f), and (g);

3) If the pressure target is met, proceed to step (h);

h) selecting an injector well geometry and calculating head pressure change, friction pressure change, and enthalpy gain or loss with the subterranean geothermal formation in which the injector well is positioned for the injector well geometry and the initial heat extraction fluid temperature, pressure and flowrate;

i) flowing the initial heat extraction fluid from the injector well into and through a first heat harvesting stage in the subterranean geothermal formation to form a heated heat extraction fluid;

j) determining whether another heat extraction stage is required to meet the power target, and if no, proceed to step (k), and if yes, repeat steps (e)-(j);

k) flowing the heated heat extraction fluid through the producer well to a producer wellhead and then to the power plant.

\*  \*  \*  \*  \*